July 11, 1961

G. W. SCHNEIDER, JR 2,991,688

OPTICAL COMPARATOR UNIT

Filed May 16, 1958

Inventor:
George W. Schneider, Jr.
by Howson & Howson
Attys.

July 11, 1961
G. W. SCHNEIDER, JR
2,991,688
OPTICAL COMPARATOR UNIT
Filed May 16, 1958
3 Sheets-Sheet 2
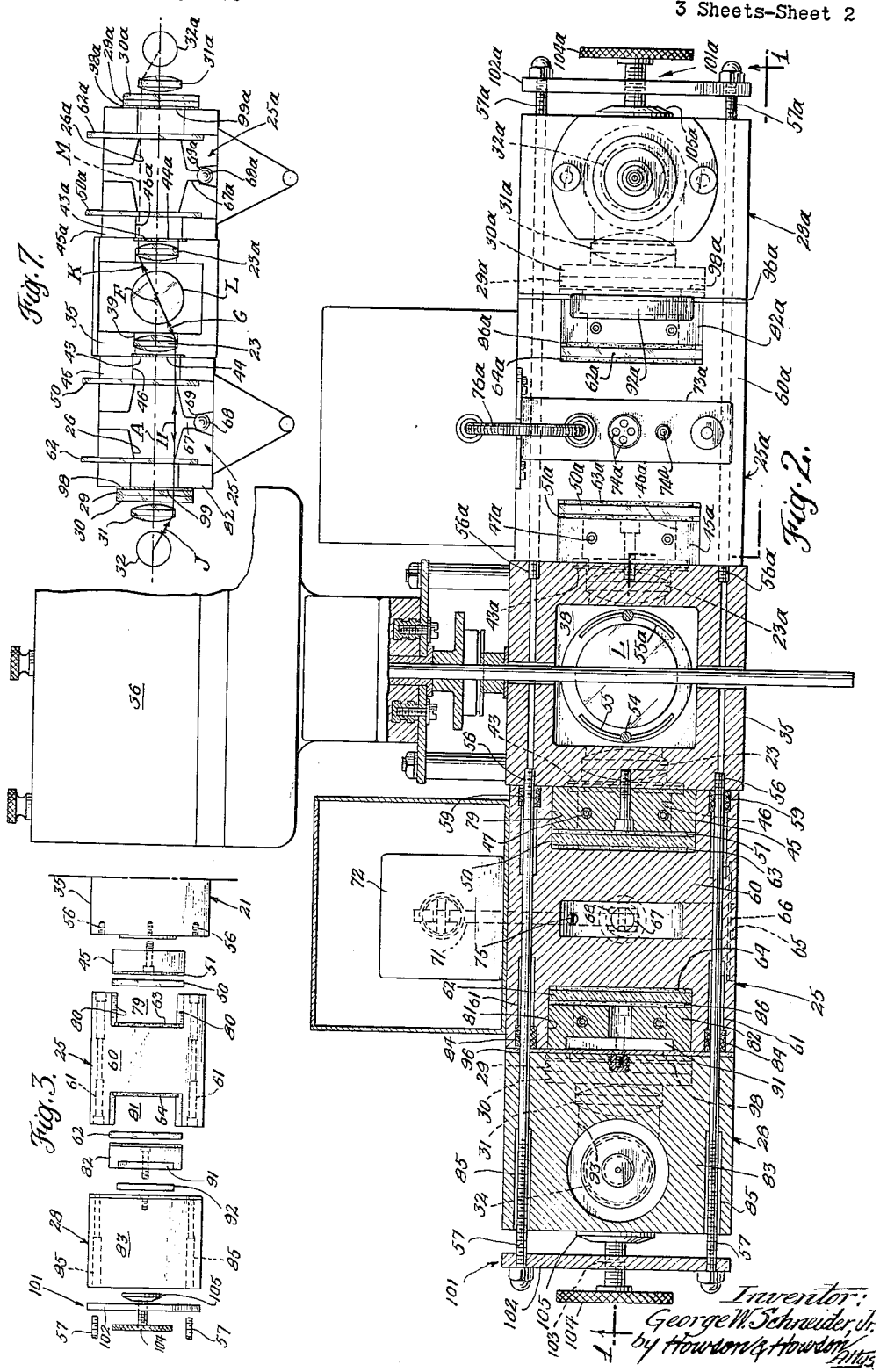
Inventor:
George W. Schneider, Jr.
by Howson & Howson
Attys July 11, 1961 — G. W. SCHNEIDER, JR — 2,991,688
OPTICAL COMPARATOR UNIT
Filed May 16, 1958 — 3 Sheets-Sheet 3

Inventor:
George W. Schneider, Jr.
by Howson & Howson
Attys.

United States Patent Office 2,991,688
Patented July 11, 1961

2,991,688
OPTICAL COMPARATOR UNIT
George W. Schneider, Jr., St. Petersburg, Fla., assignor to Milton Roy Company, Philadelphia, Pa., a corporation of Pennsylvania
Filed May 16, 1958, Ser. No. 735,837
14 Claims. (Cl. 88—14)

The present invention relates to optical systems for photo-electric comparators, and has particular application to colorimetric analyzers for liquids in which the optical components are arranged in a straight line with a light source in the center, and sample cells and photo tubes at each side of the source and having a central axis coincident with the center point of the light source.

A primary object of the present invention is to provide an optical system construction in which the elements are assembled to form liquid-tight cells for the test sample and the test standard which have readily removable translucent side walls in the optical path of the assembly.

The invention also provides apparatus enabling simple and effective means for checking the calibration of the instrument in the field.

The present invention also provides in a straight line optical system of the type described, means for eliminating the effect of internally reflected light upon the photo cells of the system.

Another object of the invention is to provide an optical system wherein the length of the light path may be simply and effectively changed by replacing one element of the assembly forming the system.

All of the objects of the invention and the various features and details of the construction and operation thereof are more fully set forth hereinafter with reference to the accompanying drawings wherein:

FIG. 2 is in part a plan-section and in part a plan-view of the apparatus as indicated by line 2—2 of FIG. 1;

FIG. 3 is a diagrammatic exploded plan view on a reduced scale of the left half of the apparatus shown in FIGS. 1 and 2;

Figure 1:
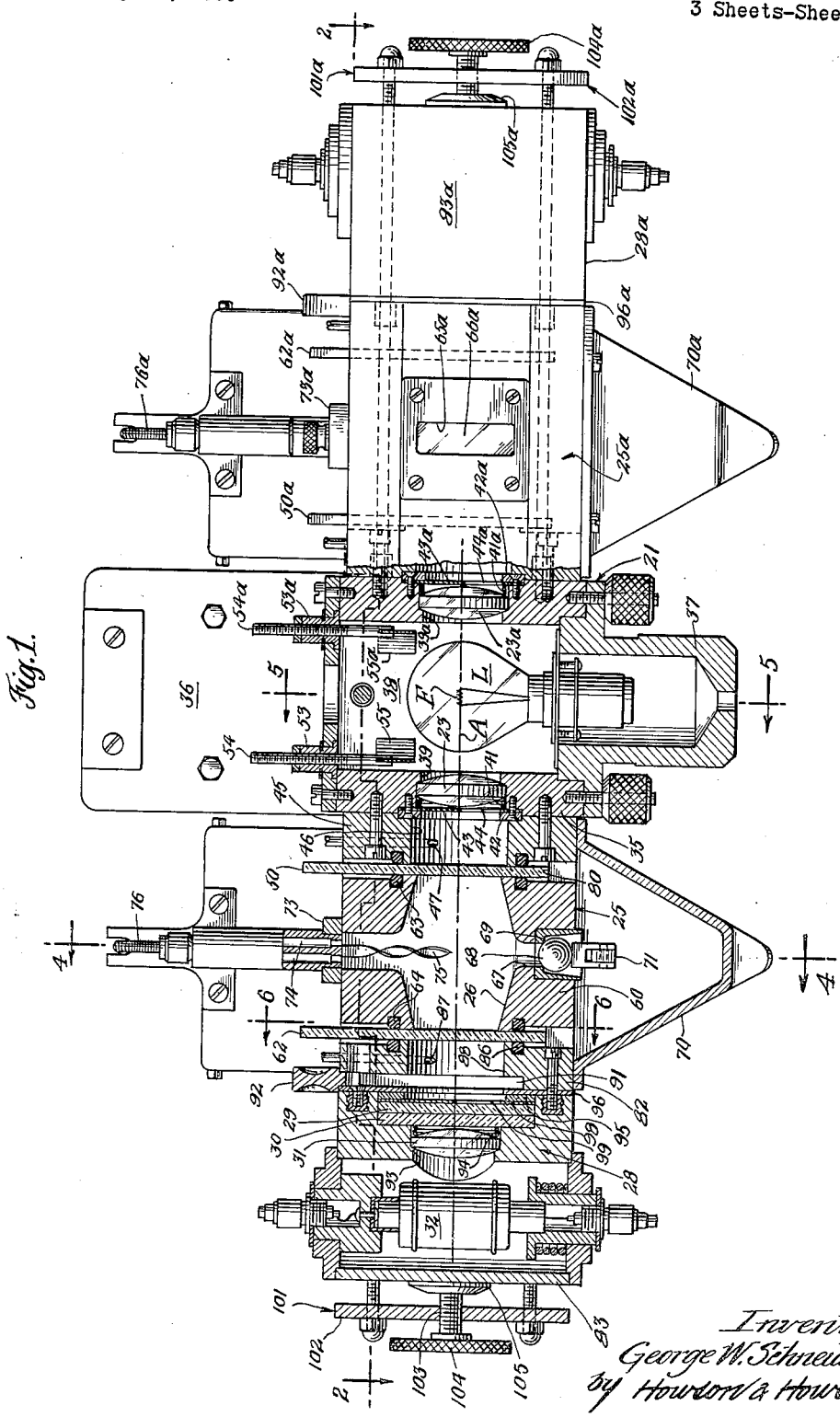
FIG. 1 is a sectional elevational-view of optical apparatus embodying the present invention taken along the line 1—1 of FIG. 2.
Figure 4:
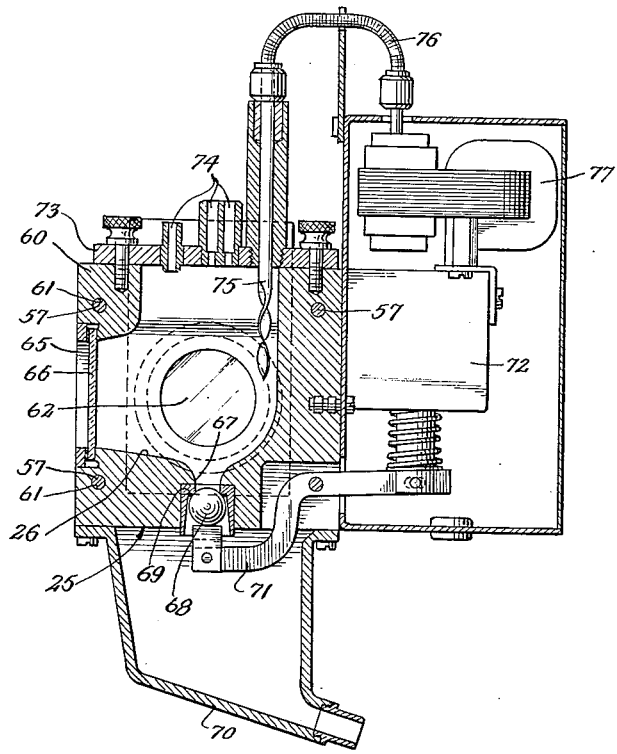
Figure 5:
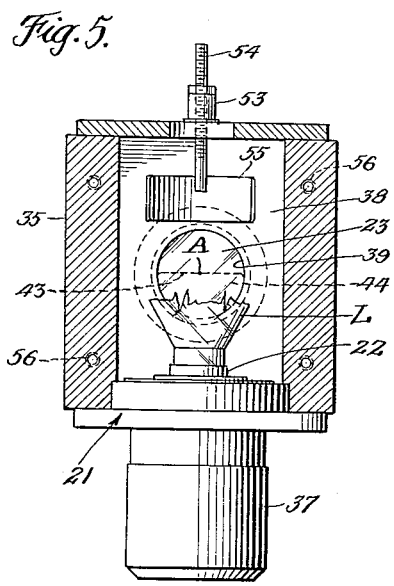
Figure 6:
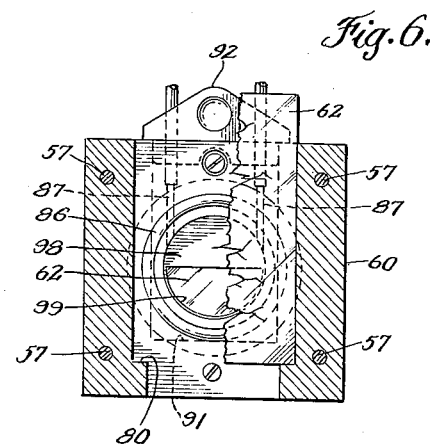

FIGS. 4, 5, and 6 are sectional views taken on lines 4—4, 5—5 and 6—6 respectively of FIG. 1; and FIG. 7 is a schematic diagram showing the optical light path through the system.

Referring now to the drawing, the illustrated embodiment of the optical system comprises a central lamp block 21 mounting the light source 22 in the present instance a lamp L, and collimating lenses 23 and 23a, cell blocks 25 and 25a at opposite sides of the lamp block forming cell cavities 26 and 26a for the sample fluid and the comparison fluid respectively, and photocell blocks 28 and 28a mounted beyond the cell blocks 25 and 25a. The photocell block 28 mounts the filters 29 and 30, the focusing lens 31 and the photocell 32. The photocell block 28a, on the other hand, mounts corresponding elements identified by corresponding reference numerals followed by the reference character a.

Inasmuch as the one side of the system is a mirror image of the other side, only one side will be described in detail.

Referring now to FIGS. 1, 2, and 4, the lamp block 21 comprises a lamp housing 35 having mounted at the rear thereof a timer assembly 36 which operates to energize the lamp at properly timed intervals with the admission and discharge of liquids to the cells 26 and 26a. A lamp base 37 mounts the light source in the light well 38 of the housing. The housing is provided with a horizontal bore 39 communicating with the well 38 and having a central axis A passing through the filament F of the lamp L mounted in the base 37. A collimating lens 23 is mounted in the bore 39 by means of a spring 41 and retaining ring 42. A diaphragm 43 is positioned intermediate the spring 41 in the retaining ring 42 to eliminate the effect of internally reflected light, as more fully set forth hereinafter. The diaphragm 43 has an aperture 44 which, in the present instance as shown in FIG. 5 is of generally semi-circular shape positioned subjacent the axis A of the bore 39.

A spacer block 45 is mounted on the housing and has a bore 46 in registry with the bore 39. Air passageways 47 are formed in the block 45 to admit dry air under pressure into the bore 46 to eliminate the possibility of fogging of the lens 23. A resilient gasket ring 51 is mounted in the spacer block 45 to bear against the transparent cell wall 50 of the cell 26.

The lamp block housing 35 also mounts an internally threaded nut 53 receiving a threaded shaft 54 having a shade 55 at its lower extremity. The shade 55 is adjustable into the path of the light to correct any major imbalance of the optical system, for example caused by substantial variation in sensitivity of the photocells 32 and 32a. The housing is also provided with threaded apertures 56 into which guide rods 57 are secured for mounting the cell block 25 and the photocell block 28 on the lamp block 21.

The cell block 25 comprises a housing 60 defining the cell 26 therein and having apertures 61 for mounting the block 25 on the mounting rods 57. As shown in FIG. 3, the housing 60 is recessed as indicated at 79 to receive the spacer block 45. The side walls of the recess receive the cell wall 50 and the inwardly projecting shoulders 80 support it against downward displacement. A similar recess is provided at 81 to receive the opposite wall 62 of the cell cavity 26.

As shown in FIG. 1, the cell cavity 26 is open along the axis A and is closed by the transparent cell walls 50 and 62. In accordance with the invention, the walls 50 and 62 are readily removable. Preferably the faces of the housing 60 which confront the walls 50 and 62 are accurately machined to produce substantially fluid-tight seats for the walls, and the possibility of seepage is prevented by sealing rings 63 and 64. When the cell block 25 is assembled to the lamp block 21, the sealing ring 63 registers with the gasket ring 51 on the spacer 45. By this construction, when axial pressure is applied to the assembly, the wall 50 is engaged flush against the seat in the housing 60 and is immobilized between the rings 51 and 63 and is not subject to pressure which would tend to fracture the wall 50. The accurate machining of the housing 60 to produce the flush engagement of the walls 50 and 62 against their seats insures accurate determination of the length of the light path through the cell cavity.

When the axial pressure is released, the walls 50 and 62 may be simply displaced upwardly and removed from the assembly for cleaning or replacement. To insure displacement of the cell block 25 into spaced relation with the lamp block 21 and the photocell block 28, springs 59 and 84 are mounted in the apertures 61 to bias the blocks apart. The bias is readily overcome by axial pressure and operates to separate the blocks only when axial pressure is released for removal of the walls 50 and 62.

The forward face of the housing 60 is formed with an inspection opening 65 closed by an inspection window 66 for examining the contents of the cell cavity 26. The cell cavity has a drain 67 in the bottom thereof which is normally closed by a ball valve 68 held in place against the valve seat 69 by an operator or lever 71 which is actuated by a solenoid 72 mounted on the rear of the housing 60 and electrically connected to the timer assembly 36 for control thereby. When the ball valve 68 is displaced from its seat 69, the contents of the cell cavity 26 are discharged into a drain pan 70 underlying the housing 60. The cell cavity 26 is closed at the top by a cover plate 73 having a plurality of ports 74 for introducing the sample liquid and reagents into the cell cavity. An agitator 75 is also mounted in the cover plate 73 for mixing the ingredients in the cell cavity 26. The agitator is driven by a flexible drive cable 76 from a motor 77 mounted adjacent the solenoid 72 and controlled by the timer assembly 36 by electrical connections (not shown).

The photocell block 28 comprises a spacer 82, a filter and lens and photocell housing 83. The elements are mounted on the guide rods 57 by apertures 85 extending through the entire length of the block 28. The spacer block 82 nests in the recess 81 of the cell block 25 against the bias of the springs 84 in the recesses 61. The spacer 82 is provided with a gasket ring 86 which registers with the sealing ring 64 and bears against the removable wall 62 of the cell cavity 26. The spacer block is provided with air passageways 87 for admitting drying air into the bore 88 of the spacer to eliminate fogging of the wall 62 and the filters 29 and 30. The spacer is also provided with a well 91 for the insertion of a calibration filter (not shown) for checking the calibration of the instrument. In the present instance, the well 91 is closed at the top by a cover member 92. The focusing lens 31 is mounted in the bore 93 of the housing 83 by a lens spring 94 which bears against the filter 30. The filter is held in place by a gasket 95 and a retaining ring 96, and a diaphragm 98 having an aperture 99 similar to the diaphragm 43 is positioned in the bore 93 of the housing 83. The elements 82 and 83 are rigidly connected by suitable fasteners into the assembly 28.

The cell block 25 and photocell block 27 are releasably clamped to the lamp block by clamping elements indicated generally at 101. A clamp plate 102 is rigidly mounted on rods 57 and has a central threaded aperture 103. A clamping screw 104 is threaded in the aperture 103 and is provided with a bearing member 105 which bears axially against the photocell block 28. Axial pressure exerted by the clamping screw 104 compresses the springs 59 and 84 and presses rings 86, 64, 63, and 51 against the removable walls 62 and 50 to form a liquid-tight cell for the liquids to be analyzed.

In the operation of the device, the opposite sides of the unit are assembled and the clamping screws 104 and 104a are closed. The liquids are then introduced into the cell cavities 26 and 26a and the comparative readings are taken from the photocells, for example by a bridge circuit (not shown). Following the reading, the liquids are drained from the cell cavities by actuating the solenoids 72 and 72a. The tests may be run at continuous intervals until such time as it is necessary to remove the cell walls 50 and 62 for cleaning. At this time, the clamping screws 104 and 104a are released to release the compression of the springs and the rings to afford removal of the cell walls for cleaning or replacement.

A more detailed description of the operation of the invention in connection with a colorimetric analysis may be had by reference to my copending applications, Serial Numbers 609,981, filed September 14, 1956, now Patent No. 2,950,396, and 738,524, filed May 28, 1958.

The construction of the optical system not only affords ready removal of the cell walls 50, 50a, 62 and 62a without dismantling the assembly, but also provides extreme flexibility in the arrangement of components. For example, when performing different types of analysis, it may be desirable to change the lengths of the light path in the sample cell cavity to accommodate different densities of color or different degrees of translucency in the test solutions. To change the length of the light path in the sample cell cavity, it is necessary only to remove the clamping plate 102 from the rods 57, remove the photocell block and the cell block from the rods, replace the cell block with one having the proper length of light path therethrough, make the necessary changes in the spacer blocks 45 and 82 and the filters and reassemble the unit.

Referring to the optical diagram in FIG. 7, the apertures operate to eliminate the effect of internally reflected light. Referring to this figure, the filament F of the lamp radiates light to the left along the line G to the collimating lens 23 which refracts the beam of light parallel to the optical axis A as indicated by the line H. The parallel beam passes through the aperture 44 of the diaphragm 43 through the sample cell cavity 26 through the aperture 99 of the diaphragm 98 to the focusing lens 31. The lens 31 focuses the beam of light along the line J to the center of the phototube 32. However, as the beam of light passes along the path, some of the light is reflected backwards as indicated by the reverse arrows due to reflection from the surfaces of the lenses, the cell walls, the photo tube, particles which may appear in the sample fluid, and other components through which the light passes. The reflected light follows the reverse of the path described above and passes diagonally through the lamp L and increases the intensity of the light radiating toward the lens 23a along the line K. The collimating lens 23a refracts the intensified beam toward the sample cell cavity 26a, but by reason of the diaphragm 43a, further passage of the intensified light is blocked. If the light were not blocked, the intensified light would follow the parallel path M to the focusing lens 31a and be refracted to the center of the photocell 32a. This intensified light would energize the photocell 32a and might cause an error as high as 10% if it is not blocked. By providing the apertures of semi-circular form all below the axis A of the optical system, maximum efficiency is obtained since substantially all of the light is permitted to pass through the lower segment of the lenses, and any reflected light which due to the geometry of the system passes through the upper segment of the lenses is blocked. Of course, the apertures may take other shapes so long as the apertures at each side of the light source are at least partially aligned parallel to the light axis A, and light reflected through the apertures at one side of the light source cannot pass through the apertures at the other side of the light source. While the diaphragms 43, and 43a are effective against reflected light, it has been found desirable to provide the additional diaphragms 98 and 98a to eliminate the minor portion of reflected and refracted light which occurs at random angles from the various surfaces of the sample cell and other optical components.

By the construction of the optical system of the present invention, a separate cell for the test liquids has been eliminated from the standard analyzer and replaced by a cell block having readily removable transparent side walls. The cell block may consist of a solid block of plastic with side walls formed of transparent plates thereby enabling more economical manufacture of the unit without sacrifice of the desirable optical properties of transparent plates. This construction also permits the use of a simple ball valve and suitable seat therefor.

While a particular embodiment of the present invention has been herein illustrated and described, it is not intended to limit the invention to such disclosure, but changes and modifications may be made therein and thereto within the scope of the following claims.

I claim:

1. An optical system for photoelectric comparators having its optical components disposed along a straight-line axis, comprising a central light source having its center of illumination on said axis, a liquid-tight cell cavity at each side of said light source having translucent side walls intersecting said axis, a photocell at each end of said axis having its center thereon and disposed to receive light passing from said light source through said liquid-tight cell cavity along said axis, a collimating lens intermediate said source and each cell cavity to make the light beams passing through the cavities parallel to the axis, a focusing lens intermediate each cell cavity and each photocell to focus said parallel light beams to the center of the photocell, and at least one element at each side of said light source having an aperture intersecting the parallel light beams passing through the cell cavity intermediate said collimating and the focusing lenses, said apertures on opposite sides of the light source being of corresponding dimensions and being offset from said axis in the same direction to eliminate the effect of internally reflected light.

2. A system according to claim 1 wherein said apertures are semi-circular in outline, having a diameter smaller than the diameter of said lenses, each of said apertures being positioned at one side of a common plane through said axis.

3. A system according to claim 1 wherein said apertures are mounted intermediate said collimating lenses and said cell cavities.

4. A system according to claim 3 including a second element having an aperture intersecting said parallel light beams intermediate each cell cavity and each focusing lens.

5. In the optical system for photoelectric analyzers having the optical components disposed along a straight line axis, a lamp block having a light well therein and a bore coaxial with said axis and extending through said block into said well, a liquid cell block mounted adjacent said lamp block and having a liquid cell cavity therein and open along said axis, a translucent plate mounted intermediate said lamp block and said liquid cell block forming a side wall of said cell cavity, a photocell block mounted adjacent said liquid cell block having a photocell well therein and a bore coaxial with said axis extending through said block into said well, a second translucent plate mounted intermediate said liquid cell block and said photocell block forming the opposite side wall of said cell cavity, and means sealing said translucent plates against said liquid cell block to form a liquid-tight cell cavity in the latter comprising accurately formed seats in said liquid cell block and annular sealing rings mounted in said liquid cell block surrounding the axial openings thereof and engaging said translucent plates, resilient gasket rings registering with said sealing rings mounted in said photocell and lamp blocks surrounding the axial bores thereof, clamping means to firmly engage said gasket rings against said translucent plates to compress the sealing rings thereagainst to provide fluid-tight seals for said cavity, and resilient means compressed between said blocks and operable upon release of said clamping means to bias said blocks into relatively axially spaced relation for removal of said plate members, said translucent plates projecting beyond said blocks to afford ready removal of said plate members upon release of said clamping means.

6. Apparatus according to claim 5 wherein said liquid cell block has a drain at the bottom, opening into said cavity, and including a valve seat in said drain, a ball valve cooperable with said seat to close said drain, and an operator engaging said ball valve to selectively actuate said valve.

7. Apparatus according to claim 6 wherein said operator comprises a lever pivoted to said cell block and a solenoid connected to one end of said lever and energizable to operate said valve, said lever at its opposite end supporting said ball valve adjacent its seat.

8. Apparatus according to claim 5 wherein said liquid cell block has an upper opening into said cavity, and including a cover plate normally closing said opening, and openings in said cover plate for introducing test liquids therein.

9. Apparatus according to claim 8 including an agitator rotatably mounted in said cover plate and depending into said cell cavity, and drive means to rotate said agitator.

10. Apparatus according to claim 5 including means to introduce moisture-free air into said bores to maintain the exposed surfaces of said translucent plates free of condensed moisture.

11. Apparatus according to claim 10 wherein said lamp block and photocell block are provided with passageways extending from the outside into said bores to constitute said means to introduce moisture-free air into said bores.

12. Apparatus according to claim 11 wherein said optical components comprise a lamp mounted in said light well with its center disposed on said axis, a collimating lens mounted in the bore of said lamp block intermediate said dry-air passageways and said light well, a focusing lens mounted in the bore of said photocell block intermediate said dry-air passageways and said photocell well, filters mounted in said apparatus intermediate said collimating and focusing lenses, and a photocell mounted in said photocell well.

13. In an optical system for photoelectric analyzers having the optical components disposed along a straight line axis, a lamp block having a light well therein and a bore coaxial with said axis and extending through said block into said well, guide rods mounted in said lamp block and projecting outwardly therefrom parallel to said axis, a fluid cell block slidably mounted on said guide rods adjacent said lamp block and having a fluid cell cavity therein and open along said axis, a translucent plate mounted intermediate said lamp block and said fluid cell block forming a side wall of said cell cavity, a photocell block slidably mounted on said guide rods adjacent said fluid cell block having a photocell well therein and a bore coaxial with said axis extending through said block into said well, a second translucent plate mounted intermediate said liquid cell block and said photocell block forming the opposite side wall of said cell cavity, and means sealing said translucent plates against said fluid cell block to form a fluid-tight cell cavity in the latter including clamping elements mounted on said guide rods outwardly adjacent said photocell block to urge said photocell block and said fluid cell block toward said lamp block and effect said fluid-tight seal.

14. Apparatus according to claim 13 including resilient means disposed intermediate the respective blocks to bias said blocks into spaced-apart relation, said resilient means being compressed by said clamping elements to dispose said blocks flush against said translucent plates.

References Cited in the file of this patent

UNITED STATES PATENTS

| | | |
|---|---|---|
| Re. 23,023 | Wolf et al. | Aug. 3, 1948 |
| 2,015,675 | Hays | Oct. 1, 1935 |
| 2,301,401 | Hennessy et al. | Nov. 10, 1942 |
| 2,395,489 | Major et al. | Feb. 26, 1946 |
| 2,483,876 | Boyer | Oct. 4, 1949 |
| 2,501,599 | Eltenton et al. | Mar. 21, 1950 |
| 2,686,454 | Ruska | Aug. 17, 1954 |
| 2,694,335 | Albright et al. | Nov. 16, 1954 |
| 2,724,304 | Crawford | Nov. 22, 1955 |